United States Patent Office 3,194,850
Patented July 13, 1965

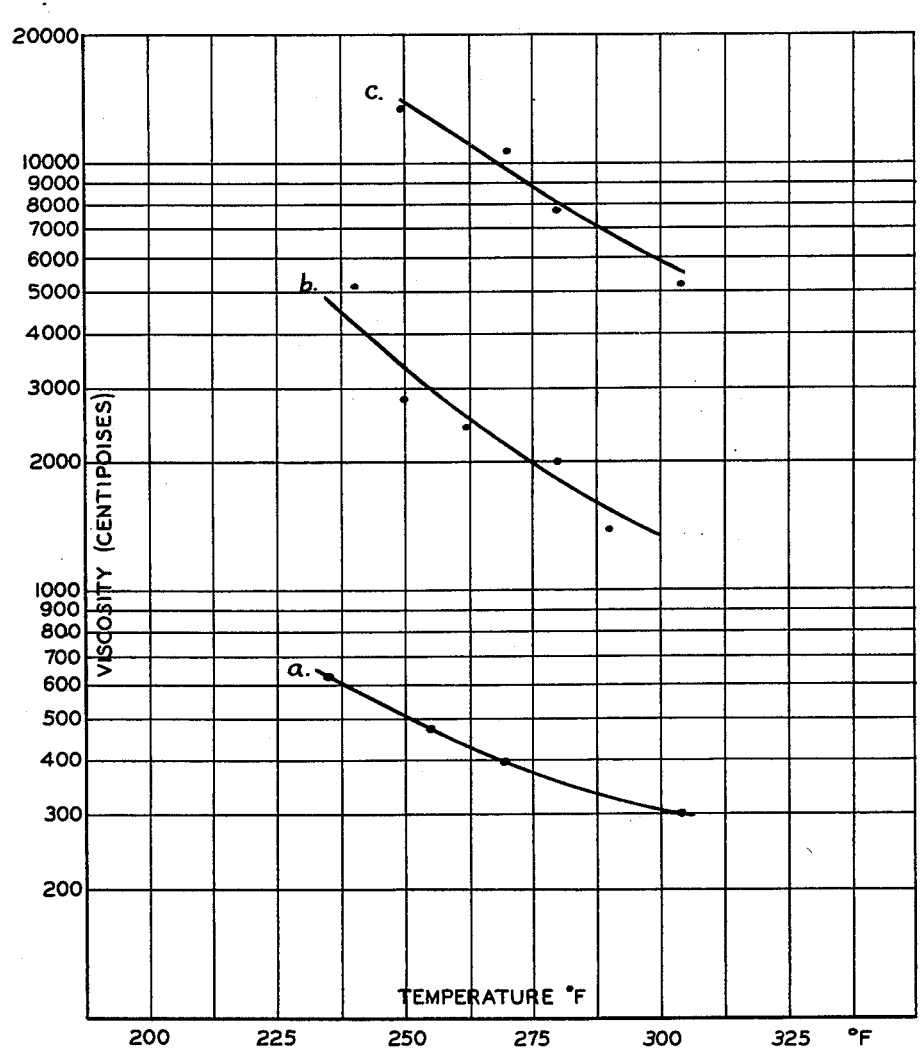

3,194,850
PROCESS OF PREPARING POLYETHYLENE RESIN BLENDS
Francis M. Sweeney, East Hempfield Township, Lancaster County, Pa., assignor to Armstrong Cork Company, Lancaster, Pa., a corporation of Pennsylvania
Filed Nov. 13, 1959, Ser. No. 852,850
1 Claim. (Cl. 260—897)

This invention relates to compositions comprising mixtures of normally solid polymers of ethylene and more specifically is directed to an improved method for forming homogeneous mixtures of two or more polyethylene resins of different molecular weights.

Polymers of ethylene are generally obtained by subjecting ethylene, with a catalyst if desired, to high pressures and elevated temperatures. Commercial polyethylenes possess molecular weights as low as about 1,000 and as high as 100,000 and more, the low molecular weight polyethylenes having a wax-like consistency.

Probably the most widely publicized commercial use for polyethylene resins is in the fabrication of flexible translucent sheeting and flexible molded plastics. The polymers may be extruded, injection molded, and blow molded. Polyethylene tubing containing pigments and stabilizers has found use as lightweight irrigation pipe, sewer lines, and in industrial piping. Polyethylene resins have also made possible a number of interesting new types of plastic articles, including kitchen bowls, squeezable bottles, disposable baby bottles, and flexible ice cube trays.

Polyethylene resins are commercially available in a wide range of molecular weights. By way of example, one supplier sells polyethylene polymers having an average molecular weight of 1,000 (greaselike), 4,000 (wax), 7,000 (soft resin), and resins of varying degreees of hardness with average molecular weights of from 10,000–38,000. One can easily see that there is a considerable degree of flexibility as to achieving the physical properties desired using the polyethylene polymers now on the market. However, in various applications, a given polyethylene resin may not have all of the properties for the specific end product desired. For this reason, it is often desirable to blend two or more polyethylene resins of different molecular weights. Thus, it might be desirable to raise the heat distortion temperature of a low molecular weight polyethylene resin through the use of a higher molecular weight polyethylene resin. It might also be desirable to modify the stiffness or the flexibility or change the melt index of a given polyethylene resin by adding either a lower molecular weight polyethylene resin or a higher molecular weight polyethylene resin to the given resin. Among other properties which might be modified through the addition of a different molecular weight polyethylene resin to a given polyethylene are color and gloss. Costs are reduced by the use of lower cost resins and by reducing the number of different molecular weight polyethylenes stocked.

When blending polyethylene resins having different molecular weights, it has been found that the optimum properties obtainable in a given blend are dependent upon the extent to which the two or more different molecular weight resins are mixed, i.e. to the extent that a homogeneous mixture is obtained. Customary methods used for obtaining blends of polyethylenes of different molecular weights are not entirely satisfactory for the resin user insofar as they do not yield homogeneous mixtures with resultant attendant poorer properties of these blends. Thus, where a low molecular weight resin was mixed with a high molecular weight resin by melting the low molecular weight resin at a temperature above its transition temperature and then adding the high molecular weight resin to the fluid melt, where it too was heated above its transition temperature and where the two resins were then stirred, the resultant melt visually appeared to be homogeneous. However, stirring showed that the high molecular weight resin existed as lumps within the more fluid low molecular weight polymer and continued stirring failed to mix the two phases. On cooling, pellets of the high molecular weight resin remained undispersed in the low molecular weight resin. Temperatures high enough to get the gelatinous globules of the high molecular weight resin fluid enough to mix with the low molecular weight resin could not be achieved without decomposing the polyethylene.

Where mixing of a high and low molecular weight polyethylene resin mixture was attempted on a rubber mill, this mixing technique too proved to be unsuccessful. Depending on the temperature of the mill, either the low molecular weight resin melted and ran off the rolls, or the high molecular weight resin flaked off before mixing with the more fluid resin. Large particles of the high molecular weight resin remained undispersed despite many variations of the milling procedure.

The primary object of this invention is to provide an improved method for blending polyethylene resins having different molecular weights to obtain more homogeneous mixtures. Ancillary objects of this invention are to provide a more efficient method for upgrading given polyethylene resins and to provide an improved method for obtaining better color in given polyethylene resins.

These and other objects will become more evident as the description proceeds.

This invention is based upon the discovery that a homogeneous blend of two or more polyethylene resins of different molecular weights can be achieved by initially forming a melt of the resins, cooling the melt thus formed to form a solid, reducing the solid to a finely divided state and remelting the finely divided solid.

The melt is initially formed by bringing the temperature of the resins to a point above their transition temperature by any convenient means. Care must be exercised, however, in maintaining the temperature at a point below the decomposition temperatures of the individual polyethylene resins. For convenience, the resin having the lower average molecular weight is usually melted first and the higher molecular weight resin is then stirred in.

The melt thus formed is then cooled to form a solid. Any convenient method may be used, one method being to place the melt in a square container, from which it may be easily removed, and allowing it to stand until cooled to room temperature.

Any of a number of methods, such as sawing, routing, filing, and planing, may be used to reduce the solid thus formed to a finely divided state. Preferably, a slow cutting action is used in reducing the solid so as to minimize heating of the resin. This cutting of the solid while cold appears to cold-work the resins and aids in mixing by pulling and stretching the two components before they break off to form a chip or sliver. The finely divided solid is then remelted by any suitable means to form a homogeneous mix. The following examples are given by way of illustration:

*Example I*

An initial blend of one part by weight of a polyethylene resin having an average molecular weight of 19,000 and three parts by weight of a polyethylene resin having an average molecular weight of 2,000 was prepared by first bringing the temperature of the low molecular weight resin to approximately 250° F. after which the high molecular weight resin was added thereto. During the addition of the high molecular weight resin, the melt was continually stirred while the temperature was maintained at a temperature above 250° F. The mixture of the two resins thus prepared was allowed to cool to room temperature to form a solid block.

The solid mixture of the two resins thus prepared was subjected to a cutting and mixing action whereby the solid mixture was reduced to fine slivers. The tool used for cutting was a combination file and plane having an open, hardened cutting blade consisting of many small cutting edges. The tool has a slow cutting action so that the slivers or chips are formed with a minimum amount of heat. The chips or slivers thus prepared were remelted to form a solid mixture of the two resins.

*Example II*

A second resin blend was prepared by milling the polyethylene resins in the proportions set forth in Example I above. The high molecular weight polyethylene was bonded on to the rear roll of a 12" wide two-roll rubber mill. Roll temperature was in the 250°–275° F. range. No difficulty was encountered in this operation. When all of the high molecular weight resin had been added, small quantities of low molecular weight polyethylene, in pellet form, were added to the mill. These pellets melted rapidly and tended to wet both rolls, but primarily the front roll, since the back roll was already coated with a sheet of the high molecular weight polymer. Since the roll temperature was from 60°–90° F. above the melting point of the low molecular weight resin, which is quite fluid above its melting point, the resin ran off of the mill almost as fast as it was added. An attempt was made to cool the rolls so that the low molecular weight resin would be retained, but before a "banding temperature" for the low molecular weight resin could be reached, the high molecular weight resin hardened to form flakes. Some mixing did occur, however, and all of the resin was finally mixed by allowing the mill temperature to drop as low molecular weight resin was added, and adding the mixed flakes again when temperature was increased.

Viscosity measurements were made of the blends prepared in accordance with Examples I and II using a Brookfield Viscometer and a #3 spindle. The results are set forth in the drawing wherein FIGURE 1 shows viscosity versus temperature curves for three polyethylene blends. These results are set forth in graph form using semilogarithmic paper. In FIGURE 1, Line $a$ represents the viscosity curve of a resin blend achieved by simply melting and stirring the two polyethylene resins in the proportions set forth in Example I, Line $b$ represents the viscosity curve of the mill-mixed polyethylene prepared in accordance with Example II, and Line $c$ represents the viscosity curve of the polyethylene blend prepared in accordance with Example I.

It is clearly evident from the drawing that the best mixing or blending was achieved in the blend prepared in accordance with this invention; by melting and stirring the two different molecular weight polyethylene resins, cooling the melt to form a solid, reducing the solid to a finely divided state by an appropriate cutting action, and remelting the thus finely divided polyethylene mixture a mixture of superior homogeneity was prepared.

The following example illustrates the advantages of this invention when coloring a high molecular weight polyethylene resin using a pigmented low molecular weight polyethylene resin.

*Example III*

Thirty parts by weight of a polyethylene resin having an average molecular weight of 2,000 was melted and 0.3 part by weight of a grey pigment was mixed into the molten polyethylene. Seventy parts by weight of a high molecular weight polyethylene resin having an average molecular weight of approximately 25,000 was added to the melt in small increments and stirred in. The high molecular weight polyethylene formed translucent gelatinous globs throughout the melt formed by the pigmented low molecular weight resin.

The melt was cooled to room temperature, subjected to a cutting and mixing action using the combination file and plane utilized in Example I for reducing the solid mixture to fine slivers whereby the solid mixture was reduced to fine slivers and the finely divided solid was then remelted. This procedure was repeated twice. After the first mix, the high molecular weight polyethylene could be visually differentiated slightly from the low molecular weight pigmented material. After the second and third mixing, one could not visually differentiate and a homogeneous solid grey pigmented material was produced.

The shavings produced from the third mixture were extruded using a ram-type injection molding machine to form circular pieces approximately 1/16" in thickness. Runs were made at temperatures from 300°–450° F. at 50° F. intervals at cylinder pressures of 600 (650 at 300° F.). A pyrometer registered a mold temperature of 120° F. in all cases. All of the pieces thus molded appeared homogeneous and had a good grey color which was solid throughout the samples.

By way of contrast, 30 parts by weight of pellets of the pigmented low molecular weight polyethylene resin were mixed with 70 parts by weight of the unpigmented high molecular weight resin and injection molded using the same temperatures and pressures used in preparing the solid colored samples. These samples showed no blending of the different molecular weight resins and the circular pieces were clearly not homogeneous but were clear in over-all appearance with grey color streaks appearing through the sample pieces.

It is to be understood that variations and modifications of the specific process herein shown and described for purposes of illustration, may be made without departing from the spirit of the invention as defined in the appended claim.

I claim:

A method of preparing a finely divided solid mixture capable of melting to form a homogeneous resin consisting essentially of at least two polyethylene resins of different molecular weights comprising forming a melt by heating said resins at a temperature above the transition temperature of said resins, stirring the melt of said resins to form a dispersion of the higher molecular weight resins in the lower molecular weight resins, cooling said melt to form a solid, reducing said solid to a finely divided state, and repeating said mixing, cooling, and reducing cycle a sufficient number of times to establish the desired degree of homogeneity.

References Cited by the Examiner

UNITED STATES PATENTS

| 2,842,508 | 7/58 | Sterk | 260—897 X |
| 2,924,854 | 2/60 | Wolinski | 260—897 X |
| 2,956,035 | 10/60 | Mock | 260—897 X |
| 2,956,042 | 10/60 | Underwood et al. | 260—897 |
| 2,983,704 | 5/61 | Roedel | 260—897 |

MURRAY TILLMAN, *Primary Examiner.*

DANIEL ARNOLD, LEON J. BERCOVITZ, *Examiners.*